United States Patent Office 3,471,488
Patented Oct. 7, 1969

3,471,488
SUBSTITUTED as-TRIAZINYLALKYLINDOLES
Donald L. Trepanier, Indianapolis, Ind., assignor to The Dow Chemical Company, Midland, Mich., a corporation of Delaware
No Drawing. Filed Oct. 23, 1967, Ser. No. 677,042
Int. Cl. C07d 57/00; A61k 27/00
U.S. Cl. 260—248                                   6 Claims

ABSTRACT OF THE DISCLOSURE

Substituted 3 - [(1,4,5,6-tetrahydro-as-triazin-3-yl)alkyl]indoles are prepared by the reaction of a 3-indole alkylimino ester and a 1-(β-aminoethyl)-1-alkylhydrazine. The novel compounds are useful as antidepressants as indicated by their antagonism of reserpine.

SUMMARY OF THE INVENTION

This invention relates to substituted indoles and is particularly directed to substituted 3-[(1,4,5,6-tetrahydro-as-triazinyl)alkyl]indoles corresponding to the formula:

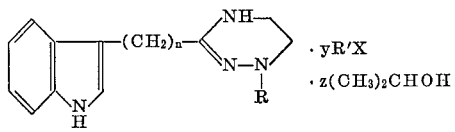

In the present specification and claims, R represents hydrogen or a lower alkyl group containing from 1, to 2, to 3 carbon atoms, R'X represents methobromide or methoiodide, $n$ represents an integer from 1, to 2, to 3, $y$ represents an integer from zero to 1 and $z$ represents zero or 1 minus $y$. The novel triazinylalkylindole compounds are crystalline solids of varying degrees of solubility in organic solvents such as ether, halogenated hydrocarbons and lower alcohols and of moderate solubility in aqueous acid and slight solubility in aqueous base.

The novel compounds are useful for administration to laboratory animals in studying the behavior thereof and in studying drug effects on the central and peripheral nervous systems. They have been found to be particularly useful as antidepressants as indicated by their antagonism of reserpine.

The novel indoles are prepared by the reaction of a 3-indole alkylimino ester corresponding to Formula II with a 1-(2-aminoethyl)-1-substituted hydrazine corresponding to Formula III:

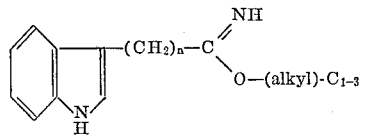

$$H_2N=CH_2=CH_2=NR=NH_2 \qquad (III)$$

In the above Formulae II and III, R and $n$ have the same significance as indicated above with respect to Formula I. The 3-indole alkylimino ester is conveniently employed in the form of its hydrohalide salt such as the hydrochloride or hydrobromide. The 3-indole alkylimino ester starting material can be prepared by the reaction of a 3-indole nitrile such as 3-indole acetonitrile, 3-indole propionitrile or 3-indole butyronitrile with a hydrogen halide such as hydrogen chloride or hydrogen bromide and a lower alcohol such as methanol, ethanol or propanol.

The 3-indole alkylimino ester hydrohalide starting materials are conveniently prepared by the reaction of 3-indole alkylnitrile with ethanol and hydrogen chloride. The unpurified imino ester starting material is then mixed with a 1-(2-aminoethyl)-1-substituted hydrazine to prepare the substituted triazinylalkylindole. The exact amount of the reactants to be employed is not critical, some of the desired product being obtained when the reactants are employed in any proportions; however, in a convenient procedure, a slight excess of 3-indole alkylnitrile as compared with the 1-(2-aminoethyl)-1-substituted hydrazine is employed.

The reaction of the 3-indole alkylimino ester hydrochloride with the 1-(2-aminoethyl)-1-substituted hydrazine proceeds when the reactants are contacted and mixed, preferably in the presence of an inert organic solvent as a reaction medium. Representative inert organic solvents which can be employed as reaction media include methanol, ethanol and isopropanol. The reaction proceeds at temperatures from 25° to 110° C. and is preferably carried out at the boiling point of the reaction mixture under reflux. The reaction is generally complete within about 1 to 48 hours. The substituted triazinylalkylindole product can be separated from the reaction mixture by conventional procedures such as evaporation to remove solvents, extraction and the like and the product can be purified by conventional procedures such as treatment with activated carbon and recrystallization. In some cases, when the substituted triazinylalkylindoles are recrystallized from isopropanol, the product crystallizes with one molar proportion of product to one molar proportion of isopropanol as an alcohol of crystallization. The products so prepared can be employed as antidepressants according to the teachings of the invention.

In a convenient procedure for the preparation of the compounds of the invention, a 3-indole alkylnitrile is mixed with absolute ethanol in anhydrous ether. The mixture is then cooled to a temperature of from −5° to 20° C. and saturated with gaseous hydrogen chloride. The mixture is held at a temperature of about 0° to 10° C. for from 6 to 40 hours, after which it is evaporated in vacuo. During the evaporation, the temperature is kept below 30° C. to prevent decomposition of the 3-indole alkylimino ester hydrochloride. The evaporation residue can be redissolved in ether and the evaporation repeated successively to partially purify the 3-indole alkylimino ester hydrochloride. The 3-indole alkylimino ester hydrochloride is then mixed with a 1-(2-aminoethyl)-1-substituted hydrazine and ethanol and the mixture is heated at the boiling point under reflux for from 2 to 72 hours. After the reaction period, the mixture is conveniently concentrated by evaporation and diluted with water. The mixture is then made acidic to pH 1 to 3 with hydrochloric acid and washed with a halogenated hydrocarbon solvent, after which the mixture is made strongly basic to pH 8 to 12 and extracted with a halogenated hydrocarbon solvent. The extract is evaporated and the product is obtained as an evaporation residue. The product can be dissolved in a lower alcohol and treated with activated carbon according to known procedures or the product can be recrystallized from an alcohol to purify the substituted triazinylalkylindole.

The methohalides of the substituted triazinylalkylindoles are prepared by mixing together a substituted triazinylalkylindole or the compound with isopropanol of crystallization with a halogenated methane such as bromomethane or iodomethane. The reaction proceeds at temperatures from 10° to 150° C. and is conveniently carried out in an inert organic solvent as reaction medium. Representative inert organic solvents which can be employed as reaction media include acetone, methanol, ethanol and ether. The product can be separated by conventional procedures such as evaporation and purified by conventional procedures such as recrystallization.

In a convenient procedure for preparing the methohalides of the compounds of the invention, a substituted triazinylalkylindole or one of the compounds with isopropanol of crystallization is mixed with an excess of iodomethane or bromomethane in methanol. The methanol solution is held at room temperature for about 6 to 72 hours and evaporated in vacuo to leave the product as a residue. The product can be purified by recrystallization from lower alcohols.

DESCRIPTION OF PREFERRED EMBODIMENTS

The following examples illustrate the invention but are not to be construed as limiting the same.

Example 1

3-indole acetonitrile (100 grams; 0.65 mole) is mixed together with ethanol (42 milliliters) and anhydrous diethyl ether (500 milliliters). The mixture is cooled to a temperature of 0° C. and saturated with gaseous hydrogen chloride. The mixture is held at a temperature of 5° C. for 18 hours, after which it is evaporated in vacuo at a temperature maintained below 30° C. Twice thereafter, 200 milliliters of ether are added to the residue and the evaporation is repeated. The solid residue of the third evaporation is mixed with 500 milliliters of absolute ethanol and 1-(2-aminoethyl)-1-methylhydrazine (53 grams; 0.60 mole). The mixture is heated to the boiling point under reflux for six hours, after which it is concentrated by evaporation in vacuo and cooled to room temperature. The cooled reaction mixture is then diluted by the addition of 300 milliliters of cold water and sufficient aqueous 10 percent hydrochloric acid is added to the mixture to adjust the pH of the mixture to pH 2. The acidified mixture is washed three times with 200 milliliter portions of methylene chloride and the washings are discarded. Aqueous 10 percent sodium hydroxide solution is added to bring the pH of the washed mixture to pH 12. The mixture is then extracted with methylene chloride. The methylene chloride extract is washed with water, dried over anhydrous magnesium sulfate and evaporated in vacuo. The evaporation residue is dissolved in hot isopropanol. Activated carbon is mixed with the isopropanol solution and the mixture is filtered. The isopropanol solution is concentrated in vacuo and cooled to crystallize the 3 - [(1,4,5,6-tetrahydro-1-methyl-as-triazin-3-yl)methyl]-indole compound with one molar proportion of isopropanol of crystallization, as a crystalline solid melting at 75°–77° C. The structure of the product is confirmed by nuclear magnetic resonance spectroscopy and the product is found by analysis to have carbon and hydrogen contents of 66.4 and 8.3 percent, respectively, as compared with the theoretical contents of 66.7 and 8.3 percent, respectively, calculated for the named structure.

In substantially the same procedure and employing similar solvents, 3-[(1,4,5,6-tetrahydro-as-triazin-3-yl)-methyl]indole, melting at 197°–198° C., is prepared by the preparation of ethyl 3-indole acetimidate hydrochloride by the reaction of 3-indole acetonitrile with ethanol and hydrogen chloride and the reaction of the ethyl 3-indole acetimidate hydrochloride with 1-(2-aminoethyl)hydrazine. The product is recrystallized from isopropanol and is found to have a carbon content of 67.22 percent, by analysis, as compared with the theoretical content of 67.26 percent, calculated for the named structure.

Example 2

3-(3-indole)propionitrile (109 grams; 0.65 mole) is mixed together with ethanol (42 milliliters) and anhydrous diethyl ether (500 milliliters). The mixture is cooled to a temperature of about 0° C. and saturated with gaseous hydrogen chloride. The mixture is held at a temperature of about 5° C. for 18 hours, after which it is evaporated in vacuo at a temperature maintained below 30° C. Twice thereafter, the residue is mixed with 200 milliliters of ether and the evaporation is repeated. The solid residue of the third evaporation is mixed with 500 milliliters of absolute ethanol and 1-(2-aminoethyl) hydrazine (44.5 grams; 0.60 mole). The mixture is heated at the boiling point under reflux for about six hours, after which it is concentrated by evaporation in vacuo and cooled to room temperature. The cooled reaction mixture is then diluted by the addition of 300 milliliters of cold water and sufficient aqueous 10 percent hydrochloric acid is added to adjust the pH of the mixture to pH 2. The acidified mixture is washed three times with 200 milliliter portions of methylene chloride and the washings are discarded. Aqueous 10 percent sodium hydroxide solution is then added to adjust the pH of the washed mixture to a pH of about 12 and the mixture is extracted with methylene chloride. The methylene chloride extract is washed with water, dried over anhydrous magnesium sulfate and evaporated in vacuo. The evaporation residue is recrystallized from diethyl ether and the 3-[2-(1,4,5,6-tetrahydro-as-triazin-3-yl)ethyl]indole product is found to melt at 80°–81° C.

In substantially the same procedure and employing similar solvents, 3-[3-(1,4,5,6-tetrahydro-as-triazin-3-yl)propyl]indole, having a molecular weight of 242, is prepared by the preparation of ethyl 4-(3-indole)butyroimidate hydrochloride by the reaction of ethanol and hydrogen chloride with 4-(3-indole)butyronitrile and the reaction of the ethyl 4-(3-indole)butyroimidate hydrochloride with 1-(2-aminoethyl)hydrazine.

Example 3

The 3-[(1,4,5,6-tetrahydro - 1 - methyl-as-triazin-3-yl) methyl]indole compound with isopropanol of Example 1 (10.5 grams; 0.05 mole) is mixed with 5 milliliters of iodomethane in 25 milliliters of methanol. The mixture is held for 18 hours at a temperature of about 25° C. The mixture is then evaporated to dryness under reduced pressure to obtain 3-[(1,4,5,6 - tetrahydro-1-methyl-as-triazin-3-yl)methyl]indole methoiodide as a residue. The product is recrystallized from ethanol and found to melt at 209°–211° C. The product is found by analysis to have carbon, hydrogen, nitrogen and iodine contents of 45.60, 5.41, 15.14 and 34.48 percent, respectively, as compared with the theoretical contents of 45.42, 5.17, 15.13 and 34.28 percent, respectively, calculated for the named structure.

In substantially the same procedure, the following methohalides are prepared:

3-[(1,4,5,6-tetrahydro - 1 - methyl-as-triazin-3-yl)methyl]indole methobromide, having a molecular weight of 319, is prepared by mixing together 3-[(1,4,5,6-tetrahydro-1-methyl-as-triazin-3-yl)methyl]indole with an excess of bromomethane.

3-[2-(1,4,5,6 - tetrahydro - as - triazin-3-yl)ethyl]indole methoiodide, having a molecular weight of 370, is prepared by mixing together 3-[2-(1,4,5,6-tetrahydro-as-triazin-3-yl)ethyl]indole with an excess of iodomethane.

The compounds of the invention have central nervous system activity as indicated by their effectiveness in antagonizing the effects of reserpine. In a representative operation, a group of 10 mice was administered the 3-[(1,4,5,6-tetrahydro - 1 - methyl-as-triazin-3-yl)methyl] indole compound with isopropanol of Example 1 at a dosage rate of 80 milligrams per kilogram by intraperitoneal injection. One hour after the injection of the test compound, each of the animals was administered reserpine at a dosage rate of 5 milligrams per kilogram by intraperitoneal injection.

The administration of 5 milligrams per kilogram of reserpine intraperitoneally to mice results in a progression of signs starting with drooping of the eyelids (ptosis) and pilo-erection and culminating in a generalized depression with decreased spontaneous motor activity and decreased responsiveness to auditory or tactile stimuli. Following the administration of the reserpine, the test animals were observed for the above signs of central nervous system depression. No ptosis was observed and the animals were found to exhibit increased spontaneous motor activity and responsiveness to auditory or tactile stimuli indicating a reversal of reserpine-induced depression.

In other operations, 3-[(1,4,5,6-tetrahydro-as-triazin-3-yl)methyl]indole was found to reverse the antagonism of the anticonvulsant effects of diphenylhydantoin by reserpine when administered at a dosage rate of 63.2 milligrams per kilogram.

What is claimed is:
1. A compound corresponding to the formula

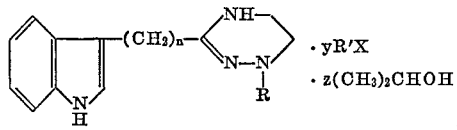 · yR'X
· z(CH₃)₂CHOH wherein R represents hydrogen or a lower alkyl group containing from 1 to 3 carbon atoms, inclusive, R'X represents methobromide or methoiodide, $n$ represents an integer from 1 to 3, inclusive, $y$ represents an integer from zero to 1, inclusive, and $z$ represents one of the integers zero and $(1-y)$.

2. The compound of claim 1 wherein the compound is 3-[(1,4,5,6-tetrahydro-1-methyl-as-triazin-3-yl)methyl] indole.

3. The compound of claim 1 wherein the compound is the 3-[(1,4,5,6-tetrahydro - 1 - methyl-as-triazin-3-yl) methyl]indole compound with isopropanol.

4. The compound of claim 1 wherein the compound is 3-[(1,4,5,6-tetrahydro-1-methyl-as-triazin-3-yl)methyl] indole methoiodide.

5. The compound of claim 1 wherein the compound is 3-[(1,4,5,6-tetrahydro-as-triazin-3-yl)methyl]indole.

6. The compound of claim 1 wherein the compound is 3-[2-(1,4,5,6-tetrahydro-as-triazin-3-yl)ethyl]indole.

References Cited

Trepanier et al., J. Medicinal Chem., vol. 9, pp. 881–5 (1966).

Hahn et al., Roczniki Chem., vol. 38, pp. 557–69 (1964), abstract available through Chem. Abstracts, vol. 61, cols. 10685–6 (1964).

JOHN M. FORD, Primary Examiner

HENRY R. JILES, Assistant Examiner

U.S. Cl. X.R.
260—326.15, 999